United States Patent [19]

Numazawa et al.

[11] Patent Number: 4,474,363

[45] Date of Patent: Oct. 2, 1984

[54] SUSPENSION FOR AUTOMOBILE

[75] Inventors: Akio Numazawa, Nagoya; Hiroki Satoh, Aichi; Kenichi Kikuchi, Toyota, all of Japan

[73] Assignee: Toyota Jidosha Kabushiki Kaisha, Aichi, Japan

[21] Appl. No.: 397,449

[22] Filed: Jul. 12, 1982

[30] Foreign Application Priority Data

Mar. 20, 1982 [JP]  Japan .................................. 57-40029

[51] Int. Cl.$^3$ .............................................. B60G 11/56
[52] U.S. Cl. ..................................... 267/34; 267/8 R; 280/668
[58] Field of Search ................... 267/61.5, 8 R, 34, 60, 267/61 R, 166, 177, 175; 280/668, 701, 724, 673, 675; 24/115 R, 263 A, 248 SA

[56]  References Cited

U.S. PATENT DOCUMENTS

| | | | |
|---|---|---|---|
| 3,603,575 | 9/1971 | Arlasky et al. | 267/34 |
| 3,829,119 | 8/1974 | Kirschner et al. | 280/724 |
| 4,348,016 | 9/1982 | Milly | 267/177 |
| 4,366,969 | 1/1983 | Benya et al. | 280/668 |

FOREIGN PATENT DOCUMENTS 1282361 11/1968 Fed. Rep. of Germany ...... 267/615
4841382 12/1973 Japan .

Primary Examiner—Duane A. Reger
Assistant Examiner—Alvin E. Oberley
Attorney, Agent, or Firm—Parkhurst & Oliff

[57]  ABSTRACT

A suspension for an automobile comprises a cylinder having a lower seat secured fixedly to an outer periphery thereof, a piston rod projecting from the cylinder and having an upper portion supported rotatably by a car body and a coil spring having lower and upper ends respectively held by the lower seat and an upper seat. To the piston rod is secured fixedly a guide having a cylindrical portion provided on an outer periphery with a thread. A movable member provided on an inner periphery with a thread engaging the thread on the guide is coupled with the guide by the engagement of both threads. The movable member is secured fixedly to the upper seat. The piston rod is provided with a tool engaging portion which is turned to adjust the car height.

8 Claims, 3 Drawing Figures

4,474,363

SUSPENSION FOR AUTOMOBILE

BACKGROUND OF THE INVENTION

1. Field of the Invention

This invention relates to a suspension for an automobile and more particularly to a suspension having a cylinder and a piston rod projecting therefrom and provided with a car height adjusting mechanism.

2. Description of the Prior Art

One of apparatuses for adjusting the car height of automobile provided with a strut type suspension manually and without use of air pressure is disclosed, for example, in the specification of U.S. Pat. No. 3,603,575. In this apparatus, a coil spring is held between a ring screwed onto the outer periphery of a tubular housing covering fixedly a cylinder and a disk fixed to a piston rod projecting from the cylinder. When the ring is turned, the piston rod extends or retracts by the action of the coil spring to adjust the car height.

In said apparatus, however, the ring has to be rotated under the condition of contacting an end of the coil spring, so that frictional force acting between the ring and coil spring is large enough and thereby the car height is not easily adjusted by turning the ring against such frictional force. Also, irrespective of the easiness of the car height adjustment, the weight of the suspension is disadvantageously increased since said housing covers the whole cylinder.

Another apparatus for ajusting manually the car height is disclosed in Japanese Utility Model publication No. 48-41382. In this apparatus, the inner periphery of a mounting block securely fixed to a car body is threaded, and a hollow screw member inserted fixedly into a piston rod projecting from a cylinder of a shock absorber is screwed in said inner periphery of the mounting block. An upper seat holding the upper end of a coil spring is held by the lower end of said hollow screw member, and the upper end of the hollow screw member is provided with an adjusting portion for engaging a tool to turn the hollow screw member and thus adjust the car height.

In said apparatus, however, since said hollow screw member is arranged above the upper seat, the total length of the car height adjusting apparatus is disadvantageously elongated.

SUMMARY OF THE INVENTION

Accordingly, an object of the present invention is to provide a suspension for an automobile provided with a car height adjusting mechanism which can easily adjust the car height with the shorter total length.

The suspension according to the present invention comprises a cylinder having a lower seat secured fixedly to an outer periphery thereof, a piston rod projecting from the cylinder and having an upper portion supported rotatably by a car body and a coil spring respectively held by said lower seat on a lower end and an upper seat on an upper end. A guide having a cylindrical portion threaded on an outer periphery thereof is secured fixedly to the piston rod below a position on which said piston rod is supported by the car body. A movable member having on an inner periphery a thread engaging said thread on the cylindrical portion of the guide and coupled with the guide by engaging both threads is secured fixedly to said upper seat. The piston rod is provided with a tool engaging portion above the position on which said piston rod is supported by the car body.

Aforementioned and other features of this invention will be more apparent from the following description with respect to the embodiment shown in the accompanying drawings.

DESCRIPTION OF THE PREFERRED EMBODIMENTS

Figure 1:
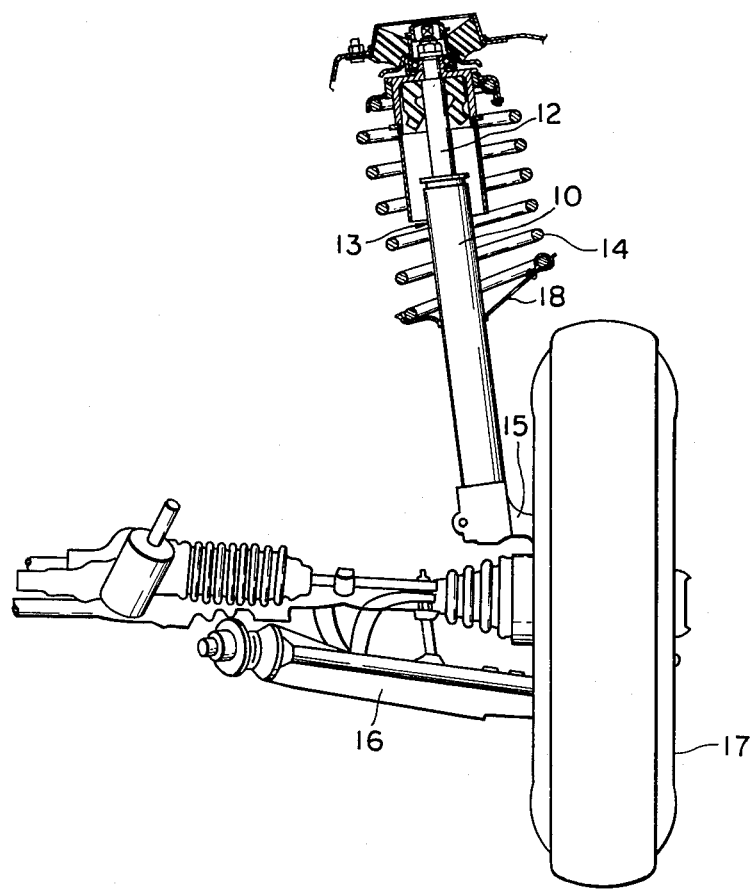
FIG. 1 is a front view of a suspension according to the present invention.

The suspension shown in FIG. 1 is a so-called strut type suspension provided with a shock absorber 13 including a cylinder 10 and a piston rod 12 connected on the lower end to a piston (not shown) slidable in said cylinder 10, and a coil spring 14 arranged around the cylinder 10.

The lower end of the cylinder 10 is connected to a knuckle 15 to support a wheel 17 together with a lower arm 16. To the outer periphery of the intermediate portion of this cylinder 10 is secured fixedly a lower seat 18 by which the lower end of said coil spring 14 is held.

Figure 2:
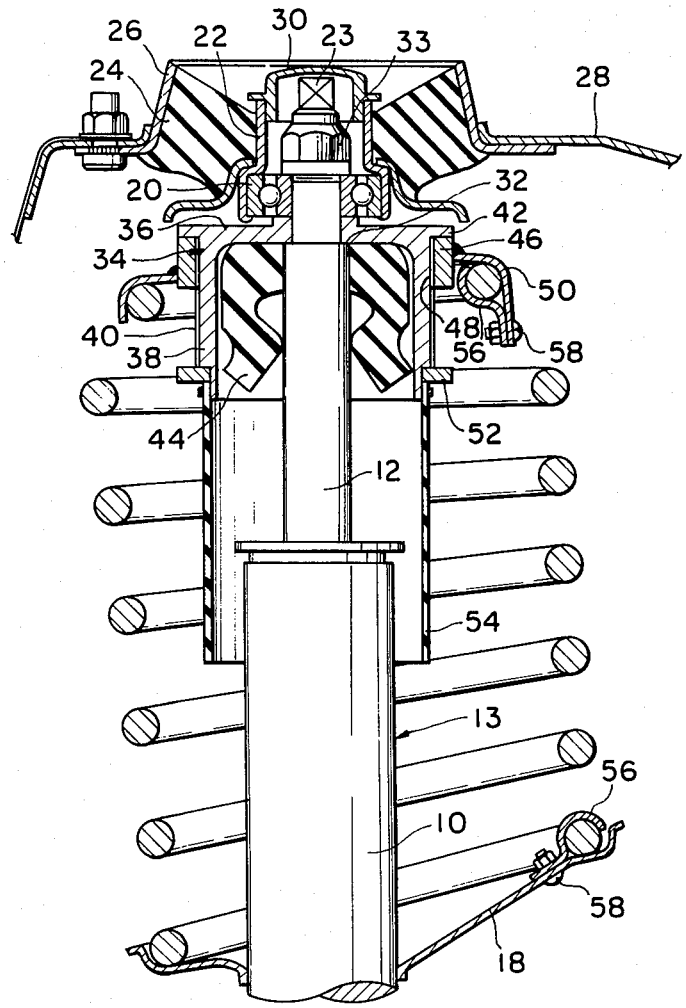
FIG. 2 is a front view of principal portions of the suspension partly in section.

On the other hand, a ball bearing 20 is fitted on the upper portion of the piston rod 12 projecting from the cylinder 10 as shown in FIG. 2. The upper portion of this piston rod 12 is connected rotatably to a car body 28 through the ball bearing 20, an inside cover 22, a vibration-proof rubber 24 surrounding and fixing securely to the inside cover and an outside cover 26 fixed to the vibration-proof rubber. The vibration-proof rubber 24 may be omitted and in such a case the ball bearing 20 may be directly mounted on the car body 28. Said inside cover 22 is caulked on the outer race of the ball bearing 20 and has above the caulked portion a tubular portion which is covered with a cap 30. The cap 30 prevents the ball bearing 20 from deposition of dust.

A guide 34 comprising a top portion 36 and a cylindrical portion 38 integral therewith and extending downward. Said top portion 36 is disposed and held between a shoulder 32 of the pistion rod 12 and the inner race of the ball bearing 20 by screwing a nut 33 from above. As a result, the guide 34 is secured fixedly to the piston rod 12. A portion of the piston rod 12 projecting from said nut 33 upward and surrounded by the tubular portion of said inside cover 22 is formed to have a horizontal square section to provide a tool engaging portion 23. The tool engaging portion 23 may have a horizontal triangular or hexagonal section. Also, the piston rod 12 may be provided in the upper end surface with a plurality of axial holes to provide the tool engaging portion. In the latter case, a lever provided with projections to be fitted in said holes may be used for a tool.

The cylindrical portion 38 of said guide 34 has a thread 40 on an outer periphery and extends downward from a position spaced inward from an outer periphery of the top portion 36. A peripheral edge of the top portion 36 extending outward from the cylindrical portion 38 is formed to provide a stopper 42. Inside said top portion 36 and cylindrical portion 38 is mounted a bound stopper 44.

Figure 3:
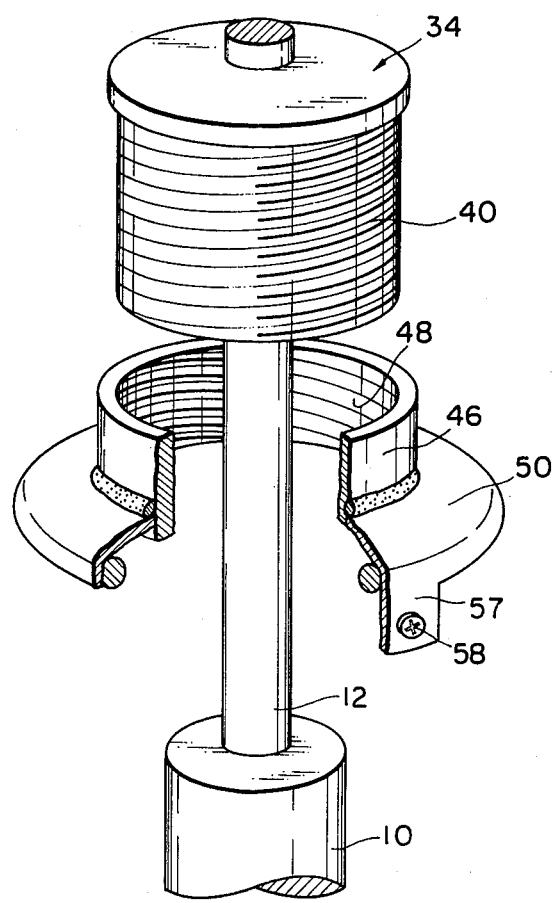
FIG. 3 is a perspective view partially cutaway of a guide and a movable member.

A movable member 46 is provided on an inner periphery with a thread 48 engaging the thread 40 on the cylindrical portion 38 of the guide 34 and is coupled with the cylindrical portion 38 by engaging both threads 40,48. The movable member 46 is cylindrical as shown in FIG. 3, and to the movable member 46 is secured fixedly an upper seat 50 which holds the upper end of said coil spring 14. The movable member 46 is moved downward as the guide 34 is turned as will be hereinafter described. The downward movement of the movable member 46 is prevented by a stopper 52 secured fixedly to the lower end of the guide 34. Accordingly, the movable member 46 moves between the upper stopper 42 and the lower stopper 52 and the distance between both stoppers 42,52 provides the adjustable car height. A dust cover 54 is fixed to the lower end of the guide 34.

In the adjustment of the car height, the cap 30 is removed and a tool such as box spanner is applied to the tool engaging portion 23 to turn the piston rod 12 with the tool. The guide 34 turns together with the turning of the piston rod 12. The movable member 46, however, does not turn since it receives force from the coil spring 14 through the upper seat 50. As shown in the embodiment of the drawings, it is preferable that a clamp plate 56 is attached to the lower and upper seats 18,50 with screws 58 to fasten a coil portion of the coil spring 14, since the action to hold the movable member 46 under the unrotatable condition is improved. The upper seat 50 is provided with an overhang 57 extending therefrom downward to be utilized for attaching the clamp plate 56 thereto as shown in FIG. 3. Since the movable member 46 does not turn, the movable member 46 moves downward as the guide 34 is turned to compress the coil spring 14. Since, however, the coil spring 14 has been compressed into the balanced condition by static load at that time, it will lift the piston rod 12 upward by a distance corresponding to the displacement of further compressed spring, resulting in the increase of the car height. To reduce the car height, the piston rod 12 is to be turned reversely.

Since the car height can be adjusted by applying the tool to the tool engaging portion to turn the piston rod according to the present invention, the car height is to be very easily adjusted. Also, since the length of the guide is substantially equal to the adjusting height of the car height, the whole cylinder does not need to be covered by the guide, so that the suspension can be lightened. Further, since the guide secured fixedly to the piston rod is provided with the threaded cylindrical portion extending downward and the movable member secured to the upper seat is coupled with the cylindrical portion of the guide, the portion of the piston rod located above the upper seat may be formed as short as possible. Thus, the total length of the suspension is to be shortened. When the suspension according to the present invention is applied for FF cars, oscillating angle of a constant velocity joint for a drive shaft is not increased since wheel stroke is not changed even by the adjustment of the car height.

What is claimed is:

1. A suspension for an automobile provided with a cylinder having a lower seat secured fixedly to an outer periphery thereof, a piston rod projecting from the cylinder and having an upper portion supported by an automobile body through a ball-and-roller bearing and a coil spring having a lower end held by said lower seat and an upper end held by an upper seat, said suspension comprising a guide having a top portion held between a shoulder of the piston rod and an inner race of said ball-and-roller bearing and a cylindrical portion extending downward from the top portion and provided on an outer periphery with a thread, a movable member secured fixedly to said upper seat and arranged at a substantially same axial level as said upper seat, said movable member being provided on an inner periphery with a thread engaging said thread on the cylindrical portion of said guide and coupled with the guide by engaging both threads, and a tool engaging portion provided on said piston rod above the position on which said piston rod is supported by said ball-and-roller bearing.

2. A suspension as claimed in claim 1, wherein said guide is provided with a pair of stoppers spaced apart in an axial direction by a distance for preventing said movable member from upward and downward movements over the distance.

3. A suspension as claimed in claim 2, wherein said cylindrical portion of said guide is connected integrally to a top portion of said guide at a position spaced inward from an outer periphery of said top portion, and a peripheral edge of said top portion extending outward from said cylindrical portion serves as said stopper for preventing said movable member from the upward movement.

4. A suspension as claimed in claim 1, wherein said upper and lower seats are respectively provided with at least one clamp plate to fasten a coil portion of said coil spring.

5. A suspension as claimed in claim 4, wherein said clamp plate provided on said upper seat is fixed to an overhang extending downward from said upper seat.

6. A suspension as claimed in claim 1, wherein said tool engaging portion is surrounded by a tubular cover and a cap put on the cover.

7. A suspension for an automobile, provided with a cylinder having a lower seat secured fixedly to an outer periphery thereof, a piston rod projecting from the cylinder and having an upper portion supported rotatably by a car body and a coil spring having a lower end held by said lower seat and an upper end held by an upper seat, said suspension comprising a guide secured fixedly to said piston rod below a position on which said piston rod is supported by said car body and having a top portion and a cylindrical portion extending downward integral with said top portion from a position spaced inward from an outer periphery of said top portion and provided on an outer periphery thereof with a thread, a movable member secured fixedly to said upper seat, provided on an inner periphery with a thread engaging said thread on the cylindrical portion of said guide and coupled with the guide by engaging both threads, a tool engaging portion provided on said piston rod above the position on which said piston rod is supported by said car body and surrounded by a tubular cover and a cap put on the cover, and a stopper fixed to a lower end of the cylindrical portion of said guide to prevent said movable member from the downward movement, a peripheral edge of said top portion extending outward from the cylindrical portion of said guide serving as another stopper for preventing said movable member from the upward movement.

8. A suspension for an automobile, provided with a cylinder having a lower seat secured fixedly to an outer periphery thereof, a piston rod projecting from the cylinder and having an upper portion supported rotatably by an automobile body and a coil spring having a lower end held by said lower seat and an upper end held by an upper seat, said suspension comprising a guide secured fixedly to said piston rod below a position on which said piston rod is supported by said automobile body, said guide having a top portion, a cylindrical portion and a stopper spaced apart in the axial direction by a distance from said top portion, said cylindrical portion being provided on an outer periphery with a thread and connected integrally to the top portion at a position spaced inward from an outer periphery of said top portion; a movable member secured fixedly to said upper seat, said movable member being provided on an inner periphery with a thread engaging said thread on the cylindrical portion of said guide and coupled with the guide by engaging both threads, said movable member being prevented from upward and downward movements greater than the distance by said stopper and a peripheral edge of the top portion of said guide extending outward from said cylindrical portion and said guide; and a tool engaging portion provided on said piston rod above the position on which said piston rod is supported by said automobile body.

* * * * *